July 22, 1958

D. M. KING 2,844,241

CONVEYOR SYSTEMS

Filed Oct. 27, 1953

United States Patent Office 2,844,241
Patented July 22, 1958

2,844,241
CONVEYOR SYSTEMS

Donald Mayer King, Stevenage, England

Application October 27, 1953, Serial No. 388,533

Claims priority, application Great Britain
October 28, 1952

5 Claims. (Cl. 198—110)

This invention relates to conveyor systems.

It is an object of the invention to provide an improved conveying mechanism.

It is a further object of the invention to provide an improved conveying system wherein trays or pallets and the like can be driven at selected speeds.

As an example of how the above objects are achieved, there is provided in accordance with one embodiment of the invention a system employing spaced endless chains each of which is driven at a different speed. Load carriers are supported adjacent these chains and the invention provides for means to couple each load carrier to a chain the speed of which is to be imparted to the load carrier.

A preferred embodiment of the invention is next described in detail with reference to the accompanying drawing in which.

Figure 1:
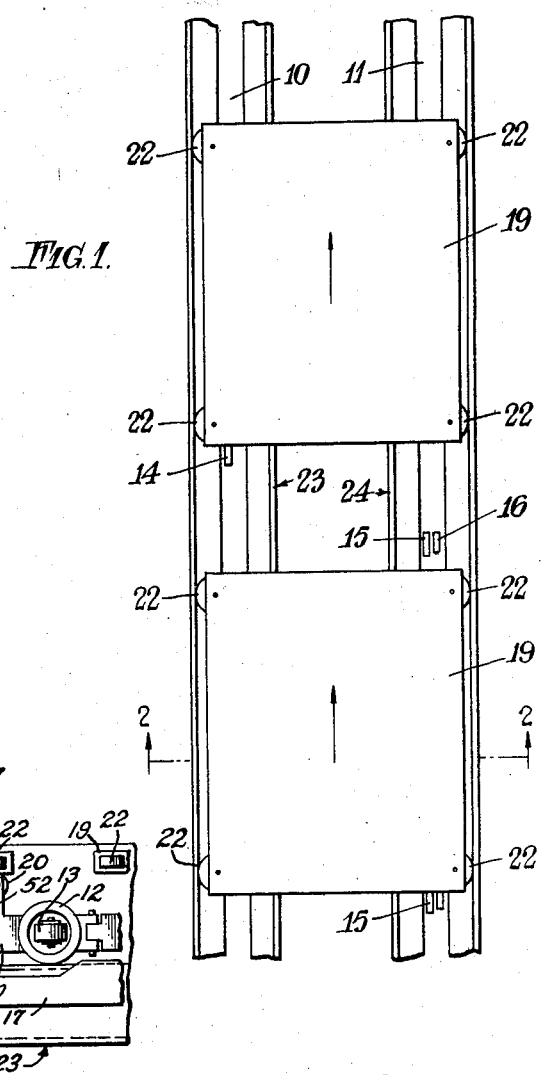
Figure 1 is a plan diagrammatic view of a portion of a conveyor system provided in accordance with the invention.

Referring to the drawing, two endless driving chains 10 and 11 each include, in known manner a plurality of pairs of rollers, such as 12, which are adapted to rotate about normally horizontal axes and a plurality of pairs of rollers, such as 13, adapted to rotate about normally vertical axes, thereby to provide rolling support for the chain, both vertically and laterally. The two chains 10 and 11 are disposed in spaced parallel relation in a common horizontal plane, and the arrangement is such that each will be driven by a separate or independent variable speed drive. Preferably, one chain, e. g. the chain 10, will be driven at a faster speed than the other, thereby to provide a high speed and a low speed chain. In certain cases, it may be desirable to drive said chains in opposite directions. Each chain incorporates in known manner a plurality of pusher dogs or the like, which are disposed at spaced points therealong and are so mounted as to be capable of projection or retraction into or from an operative position, wherein they will project upwardly from the chain when in the upper flight thereof. In the embodiment illustrated in Figures 1-3, the pusher dogs on the respective chains are indicated at 14 and 15. If desired, a number of pusher dogs of differing heights may be incorporated on the chain, sets of such dogs being arranged at spaced points along the chain and the dogs of each set being disposed across the width of the chain. The number and disposition of the dogs in each set may be varied to give as many working combinations as may be required. Preferably also, the low speed chain, in this case, the chain 11, will carry a plurality of restraining dogs one of which is indicated at 16 in Figure 1, which will be interposed between the pusher dogs and the purpose of which will be hereinafter made apparent.

Figure 3:
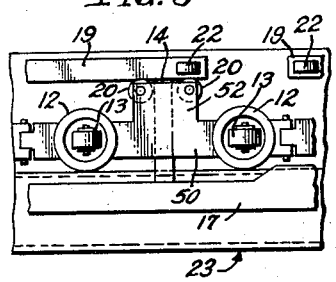
Figure 3 is a side elevational view of a portion of the system with a part of the associated track removed to show details.
Figure 2:
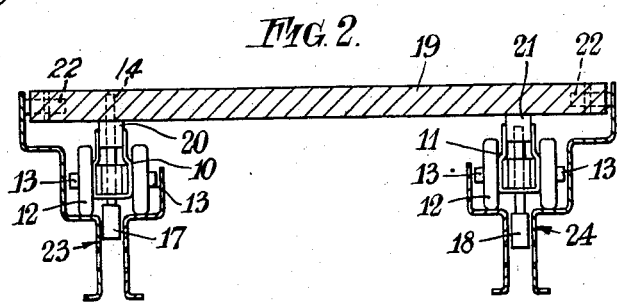
Figure 2 is a sectional view along line 2—2 of Fig. 1.

Disposed below the path of travel of the chains 10 and 11 at one or more preselected points or zones is or are one or more ramps or the like, indicated at 17 and 18 in Figures 2 and 3. The or each ramp may be fixed in an operative position or it may, as indicated in Figure 2 wherein the ramp 17 is operative, be so mounted as to be movable into and out of such operative position, wherein it will be effective to move and to maintain the pusher dogs and the restraining dogs, where present, into and in their operative positions.

The two chains 10 and 11 are adapted to provide travelling support for a plurality of trays or pallets 19 which are so dimensioned as to bridge the space between the chains and to rest thereon. In the embodiment illustrated, each chain incorporates a plurality of freely rotatable rollers 20, 21 respectively which are arranged to project upwardly therefrom and on which the trays or pallets 19 will actually be supported. Alternatively each tray or pallet 19 may have rollers mounted at the underside thereof adapted to bear on the upper surface of the chains, the latter incorporating plates or the like therein, adapted to provide running surfaces for the rollers. By virtue of the interposition of rollers between the trays or pallets and the chains, it will be possible to stop said trays or pallets at any time without interrupting or interfering in any way with the drives to the chains. Suitable stop devices may be provided at one or more points along the conveyor path in order to effect stoppage of the trays or pallets for loading, unloading or other purposes. The stops, where present, may be operated manually, mechanically or by electrical means, or, if desired, means may be incorporated either on the trays or pallets or adjacent the path of the chains, to be actuated by elements carried by said trays or pallets in their passage along the conveyor, such means being capable of being set to effect automatic stoppage of any tray or pallet at any selected point or points along said conveyor path.

It will be appreciated that with a system, such as is described above, it will be possible by suitable manipulation of the pusher dogs 14, 15 to cause a drive to be imparted to each tray or pallet from either the high speed or the low speed chain, said dogs, when in their operative position, being adapted to bear on the rear of the trays or pallets. The drive may be switched from one chain to the other as required, it only being necessary to locate ramps for actuating said pusher dogs at the required points along the conveyer path. It will be appreciated that, due to the fact that the trays or pallets 19 are supported simultaneously on both chains 10, 11, there will be a tendency, when the drive is being transmitted to any tray or pallet by the slow speed chain, for said tray or pallet to be carried away with the high sped chain owing to friction. This tendency is obviated by virtue of the presence of the aforementioned restraining dogs 16 on the slow speed chain, such dogs being so disposed that one will be disposed forwardly of each tray or pallet, so that in the event of any tendency to forward movement away from the pusher dog, said tray or pallet will abut against and will be restrained by said restraining dog.

Since the trays or pallets 19 are driven by a dog which is in engagement with one corner thereof only, they must be designed to avoid jamming, especially on tracks which are curved in the horizontal plane. For this reason, said trays or pallets 19 are provided with freely rotatable rollers, balls or the like 22 which project laterally therefrom and engage guide rails or the like disposed at opposite sides of the conveyor path.

In the embodiment illustrated, the conveyor, i. e. the two chains 10, 11 are disposed within channelled tracks 23, 24 which are relatively so arranged as to accommodate the trays or pallets, the outer wall of each of such tracks being extended upwardly as is clearly shown in Fig. 2 to constitute the guide rails or the like for the laterally directed rollers, or the like 22 on the trays or pallets 19.

It will be appreciated that the system above described is not limited to the provision of two parallel driving chains, since any number of such chains may be provided, thereby to allow for numerous driving speeds for the trays or pallets. Furthermore, instead of arranging for the pusher dogs and the restraining dogs, where present, to be moved vertically upwardly or downwardly relatively to the driving chains, such dogs may be so mounted as to be capable of horizontal movement into and out of their operative positions, the trays or pallets in this case being provided with suitable means with which said dogs or the like will cooperate.

What is claimed is:

1. A conveyor system comprising two endless chains disposed in spaced parallel relation and driven at different speeds, a plurality of load carriers each freely supported simultaneously on both of said chains, and means for effecting a driving connection between a selected one of said chains and each of said load carriers.

2. A conveyor system comprising two endless chains disposed in spaced parallel relationship and driven at different speeds, a plurality of load carriers each freely supported simultaneously on both of said chains, driving abutments disposed at spaced points along each chain and each so mounted as to be capable of projective movements relatively thereto, and means at preselected points along the conveyor path to cause projective movement of the abutments of a related one of said chains into driving engagement with the carriers.

3. A conveyor system comprising two endless chains disposed in spaced parallel relationship and driven at different speeds, a plurality of load carriers each freely supported simultaneously on both of said chains, driving abutments spaced along each chain and each so mounted as to be capable of projective movement relatively thereto, and ramp means disposed adjacent each chain at preselected points along its path of travel, such ramp means being operative to impart a projective movement to the driving abutments of the related chain thereby to cause the same drivingly to engage the load carriers.

4. A conveyor system comprising two endless chains disposed in spaced parallel relationship and driven at different speeds, a plurality of load carriers each freely supported simultaneously on both of said chains, driving abutments disposed at spaced points along each chain and each so mounted as to be capable of projective movement relative thereto, means at preselected points along the conveyor path to cause projective movement of the abutments of the related chain into driving engagement with the carriers and means on the slower of the two chains operative when a load carrier is driven by the slower chain to prevent undesired forward movement of said carrier relatively to said slower chain due to the friction exerted on the carrier by the faster chain.

5. A conveyor system comprising two endless chains disposed in spaced parallel relationship and driven at different speeds, a plurality of load carriers each freely supported simultaneously on both of said chains, driving abutments spaced along each chain and capable of projective movement relatively thereto, means at preselected points along the conveyor path to cause projective movement of the abutments of the related chain into driving engagement with the carriers, rigid guide means disposed laterally with respect to such chains and laterally directed roller means associated with each carrier to cooperate with said guide means thereby to prevent undesired lateral displacement of the carrier relatively to said chains.

References Cited in the file of this patent

UNITED STATES PATENTS

| | | |
|---|---|---|
| 1,720,113 | Argabrite | July 9, 1929 |
| 1,876,066 | Logan | Sept. 6, 1932 |
| 1,983,492 | Reed | Dec. 4, 1934 |
| 2,317,675 | De Burgh | Apr. 27, 1943 |
| 2,325,862 | Jepson | Aug. 3, 1943 |
| 2,640,607 | De Burgh | June 2, 1953 |